(12) United States Patent
Isojima et al.

(10) Patent No.: US 10,218,170 B2
(45) Date of Patent: Feb. 26, 2019

(54) CURRENT-LIMITING DEVICE UTILIZING A SUPERCONDUCTOR FOR A CURRENT-LIMITING OPERATION

(71) Applicant: SUMITOMO ELECTRIC INDUSTRIES, LTD., Osaka-shi, Osaka (JP)

(72) Inventors: Shigeki Isojima, Osaka (JP); Shuichi Nogawa, Osaka (JP); Kouji Noguchi, Kyoto (JP); Kazuhiro Kuroda, Kyoto (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 339 days.

(21) Appl. No.: 14/770,953

(22) PCT Filed: Mar. 26, 2014

(86) PCT No.: PCT/JP2014/058537
§ 371 (c)(1),
(2) Date: Aug. 27, 2015

(87) PCT Pub. No.: WO2014/162950
PCT Pub. Date: Oct. 9, 2014

(65) Prior Publication Data
US 2016/0013635 A1    Jan. 14, 2016

(30) Foreign Application Priority Data
Apr. 1, 2013  (JP) .................................. 2013-075908

(51) Int. Cl.
*H02H 9/02* (2006.01)
*H02H 3/08* (2006.01)

(52) U.S. Cl.
CPC .............. *H02H 9/023* (2013.01); *H02H 3/08* (2013.01); *Y02E 40/69* (2013.01)

(58) Field of Classification Search
CPC ............ H02H 9/023; H02H 9/00; H02H 9/02; H02H 3/08; H02H 7/001; Y02E 40/69; H03K 17/92; H01F 6/06; H01F 6/02
(Continued)

(56) References Cited

U.S. PATENT DOCUMENTS

| 3,629,690 A | 12/1971 | Massar | |
| 5,737,162 A * | 4/1998 | Ito | ........................ H01H 33/596 361/13 |

(Continued)

FOREIGN PATENT DOCUMENTS

| CN | 101127440 | 2/2008 |
| CN | 101183129 | 5/2008 |

(Continued)

OTHER PUBLICATIONS (IEEE Xplore Digital Library [online]. ieeexplore.ieee.org [retrieved on Mar. 16, 2012]. Retrieved from the Internet: <URL: https://ieeexplore.ieee.org/stamp/stamp.jsp?tp=&arnumber=6069867>.*

(Continued)

*Primary Examiner* — Thienvu Tran
*Assistant Examiner* — Nicolas Bellido
(74) *Attorney, Agent, or Firm* — Drinker Biddle & Reath LLP

(57) ABSTRACT

A current-limiting device is a current-limiting device that uses a superconductor to perform a current-limiting operation, the current-limiting device including: a superconducting current-limiting element including the superconductor; a capacitor; a reactor; and a bypass switch. The series capacitor is connected in series to the superconducting current-limiting element. The current-limiting reactor is further (Continued)

connected in series to a series circuit including the superconducting current-limiting element and the series capacitor. The thyristor switch is connected in parallel to the series circuit.

4 Claims, 5 Drawing Sheets

(58) Field of Classification Search
USPC .................................................. 361/19, 93.9
See application file for complete search history.

(56) References Cited

U.S. PATENT DOCUMENTS

| | | | |
|---|---|---|---|
| 9,762,051 B2* | 9/2017 | Isojima | H02H 9/023 |
| 2008/0043382 A1* | 2/2008 | Lee | H02H 7/001 |
| | | | 361/19 |
| 2008/0056327 A1 | 3/2008 | Gerritsen | |
| 2009/0052097 A1 | 2/2009 | Hyun et al. | |
| 2016/0020604 A1* | 1/2016 | Isojima | H02H 9/023 |
| | | | 361/93.9 |

FOREIGN PATENT DOCUMENTS

| | | | | |
|---|---|---|---|---|
| CN | 101373895 | | 2/2009 | |
| CN | 102035196 A | | 4/2011 | |
| CN | 102646968 A | | 8/2012 | |
| DE | 19963181 | | 7/2001 | |
| DE | 19963181 A1 * | | 7/2001 | ............ H01L 39/16 |
| JP | 2-101926 | | 4/1990 | |
| JP | 2-116184 | | 4/1990 | |
| JP | 2-202320 | | 8/1990 | |
| JP | H03-245725 A | | 11/1991 | |
| JP | H04-207924 A | | 7/1992 | |
| JP | 7-209371 | | 8/1995 | |
| JP | 9-074682 | | 3/1997 | |
| JP | H09-130966 A | | 5/1997 | |
| JP | 2850810 B2 * | | 1/1999 | |
| JP | H11-146555 A | | 5/1999 | |
| JP | 2947927 B2 * | | 9/1999 | |
| JP | 2000-090788 A | | 3/2000 | |
| JP | 2000090788 A * | | 3/2000 | |
| JP | 2001-078362 | | 3/2001 | |
| JP | 2001078362 A * | | 3/2001 | |
| JP | 2004-350337 A | | 12/2004 | |
| JP | 3965037 B2 * | | 8/2007 | |
| JP | 2007-236108 A | | 9/2007 | |
| JP | 2008-048588 | | 2/2008 | |
| JP | 2010017016 A | | 1/2010 | |

OTHER PUBLICATIONS

Hans-Peter Kraemer et al., "Superconducting Fault Current Limiter for Transmission Voltage," Physics Procedia 36 (2012) 921-926.
Kejun LI, "Studies on Dynamic Simulation and Control Strategies of the Thyristor Controlled Series Compensation (TCSC)", Chinese Doctoral Dissertations & Master's Theses Full-Text Database: Engineering Science and Technology II, Jul. 15, 2006, pp. 18-20, with English-language translation of relevant portion attached.
U.S. Notice of Allowance dated May 12, 2017 that issued in U.S. Appl. No. 14/770,998 attached.
U.S. Appl. No. 14/770,998, filed Aug. 27, 2015, Sumitomo Electric Ind Ltd.
Yuji Yamazaki et al., "Development of TCSC Application to Fault Current Limiters", IEEJ Transations on Power and Energy, the Institute of Electrical Engineers of Japan, vol. 121 (2001), No. 4, pp. 514-519.

* cited by examiner

FAULT CURRENT
(CURRENT PASSING
THROUGH
CURRENT-LIMITING
DEVICE)

CURRENT-LIMITING
DEVICE
CONSUMPTION
ENERGY (MJ)
TOTAL VALUE OF
THREE PHASES

CURRENT-LIMITING DEVICE UTILIZING A SUPERCONDUCTOR FOR A CURRENT-LIMITING OPERATION

TECHNICAL FIELD

The present invention relates to a current-limiting device, and more particularly to a current-limiting device that uses a superconductor.

BACKGROUND ART

There has been conventionally proposed a current-limiting device that uses a superconductor placed in a power system (refer to, for example, Japanese Patent Laying-Open No. 9-130966 (PTD 1)). FIG. 6 of PTD 1 discloses a current-limiting device including: a current-limiting element including a superconductor; and a current-limiting reactor connected in parallel to the current-limiting element. In such a current-limiting device, due to an excessive current caused by an accident and the like, the superconductor in the current-limiting element shifts to a normal conducting state (quenches), and thus, the resistance becomes high and commutation of the current to the current-limiting reactor occurs. As a result, a current-limiting impedance is generated in the current-limiting reactor and the excessive current can be limited.

CITATION LIST

Patent Document

PTD 1: Japanese Patent Laying-Open No. 9-130966

SUMMARY OF INVENTION

Technical Problem

However, in the aforementioned conventional current-limiting device, the current may flow through the current-limiting reactor and the current-limiting element during the current-limiting operation. Therefore, there has been a problem of an increase in energy consumed by the superconductor in the current-limiting element, which lengthens the time to recovery of the current-limiting element.

The present invention has been made to solve the aforementioned problem and an object of the present invention is to provide a current-limiting device in which the time from the current-limiting operation to recovery can be shortened.

Solution to Problem

A current-limiting device according to the present invention is a current-limiting device that uses a superconductor to perform a current-limiting operation, the current-limiting device including: a superconducting current-limiting element including the superconductor; a capacitor; a reactor; and a bypass switch. The capacitor is connected in series to the superconducting current-limiting element. The reactor is further connected in series to a series circuit including the superconducting current-limiting element and the capacitor. The bypass switch is connected in parallel to the series circuit including the superconducting current-limiting element and the capacitor.

With this, when an excessive current flows through the current-limiting device, the superconductor in the superconducting current-limiting element shifts to the normal conducting state. In addition, by turning on the bypass switch, the current can be flowed to bypass the superconducting current-limiting element. Therefore, the consumption energy in the superconducting current-limiting element during the current-limiting operation can be sufficiently reduced. As a result, the time from the current-limiting operation to recovery can be shortened.

The reactor in the current-limiting device has a function as a current-limiting reactor. The capacitor connected in series to the reactor is for canceling an inductance (L) of the aforementioned reactor by LC resonance, thereby achieving a lower impedance of the current-limiting device in a normal state. When an excessive current flows through the current-limiting device due to an accident and the like, the superconducting current-limiting element autonomously shifts to the normal conducting state at high speed as described above. Therefore, even if the operation timing of the bypass switch lags behind the aforementioned current-limiting operation, application of an excessive load (excessive voltage) to between the terminals of the capacitor can be prevented reliably. Furthermore, by using the superconducting current-limiting element as described above, a transient component of the passing current caused by the delay in operation timing of the bypass switch can also be suppressed.

In addition, when an excessive current flows through the current-limiting device as described above, the superconducting current-limiting element shifts to the normal conducting state at high speed, and thus, the current flowing through the capacitor is diverted to the parallel circuit in which the bypass switch is located. Therefore, the current having flowed through the series circuit including the reactor and the capacitor does not flow any longer, and thus, the LC resonance having canceled the inductance of the reactor does not occur any longer. Therefore, the overcurrent can be limited by the impedance (current-limiting impedance) of the reactor.

Advantageous Effects of Invention

According to the present invention, there can be provided a current-limiting device in which the time from the current-limiting operation to recovery can be shortened.

DESCRIPTION OF EMBODIMENTS

Figure 1:
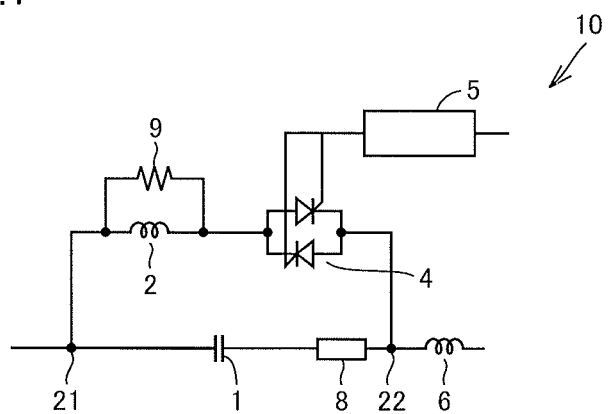
FIG. 1 is a circuit diagram for describing a first embodiment of a current-limiting device according to the present invention.

Embodiments of the present invention will be described hereinafter with reference to the drawings. In the following drawings, the same reference numerals are assigned to the same or corresponding portions and description thereof will not be repeated.

First Embodiment

A current-limiting device according to the present invention will be described with reference to FIG. 1. A current-limiting device 10 according to the present invention includes a series capacitor 1, a superconducting current-limiting element 8, a current-limiting reactor 6, a thyristor switch 4, a current suppression circuit, and a control circuit 5. The current suppression circuit is formed of a suppression reactor 2 and a suppression resistor 9. Superconducting current-limiting element 8 is connected to series capacitor 1. On the side opposite to the side of connection to series capacitor 1, superconducting current-limiting element 8 is connected to current-limiting reactor 6. A parallel circuit including thyristor switch 4, suppression reactor 2 and suppression resistor 9 is formed to be connected in parallel to a series circuit formed of series capacitor 1 and superconducting current-limiting element 8. At connection points 21 and 22, this parallel circuit is connected to the aforementioned series circuit formed of superconducting current-limiting element 8 and series capacitor 1. In the parallel circuit, suppression reactor 2 and suppression resistor 9 are connected in parallel, and thyristor switch 4 is connected in series to these suppression reactor 2 and suppression resistor 9 connected in parallel. Control circuit 5 is connected to thyristor switch 4.

According to current-limiting device 10 configured as described above, when an excessive current flows through current-limiting device 10 due to an accident and the like in a power system having current-limiting device 10 placed therein, superconducting current-limiting element 8 quenches, and thus, the current-limiting operation is performed quickly and autonomously. Therefore, application of an overvoltage to between the terminals of series capacitor 1 can be suppressed reliably. In addition, after the aforementioned current-limiting operation, the parallel circuit including thyristor switch 4 allows the current to flow to bypass superconducting current-limiting element 8. Therefore, the overcurrent can be limited by a current-limiting impedance in current-limiting reactor 6, and the consumed thermal energy generated in superconducting current-limiting element 8 can be reduced. As a result, high-speed recovery of superconducting current-limiting element 8 becomes possible. In addition, a portion of parallel connection of suppression reactor 2 and suppression resistor 9 arranged in the parallel circuit is a current suppression circuit and has a function of suppressing a discharge current from the capacitor during the bypass switch operation.

Second Embodiment

A second embodiment of the current-limiting device according to the present invention will be described with reference to FIG. 2.

Figure 2:
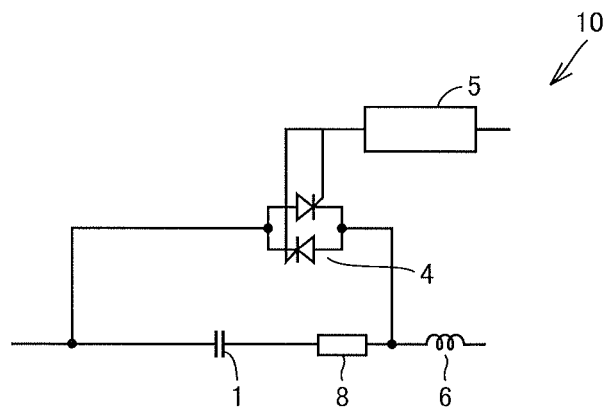
FIG. 2 is a circuit diagram for describing a second embodiment of the current-limiting device according to the present invention.

Referring to FIG. 2, current-limiting device 10 basically has a structure similar to that of current-limiting device 10 shown in FIG. 1. However, in terms of the configuration of the parallel circuit, current-limiting device 10 is different from current-limiting device 10 shown in FIG. 1. Specifically, in current-limiting device 10 shown in FIG. 2, suppression resistor 9 and suppression reactor 2 are not arranged in the parallel circuit and only thyristor switch 4 is placed in the parallel circuit. According to current-limiting device 10 having such a structure as well, the overvoltage between the terminals of series capacitor 1 can be suppressed, and the thermal energy generated in superconducting current-limiting element 8 during the current-limiting operation can be reduced, and thus, high-speed recovery becomes possible, similarly to current-limiting device 10 shown in FIG. 1.

Characteristic configurations of the present invention will be described hereinafter, although some of them have been already described in the aforementioned embodiments.

Current-limiting device 10 according to the present invention is current-limiting device 10 that uses a superconductor to perform the current-limiting operation, current-limiting device 10 including: superconducting current-limiting element 8 including the superconductor; a capacitor (series capacitor 1); a reactor (current-limiting reactor 6); and a bypass switch (thyristor switch 4). Series capacitor 1 is connected in series to superconducting current-limiting element 8. Current-limiting reactor 6 is further connected in series to a series circuit including superconducting current-limiting element 8 and series capacitor 1. Thyristor switch 4 is connected in parallel to the aforementioned series circuit.

With this, when an excessive current flows through current-limiting device 10, the superconductor in superconducting current-limiting element 8 shifts to the normal conducting state. In addition, by turning on thyristor switch 4, the current can be flowed to bypass superconducting current-limiting element 8. Therefore, the consumption energy in superconducting current-limiting element 8 during the current-limiting operation can be sufficiently reduced. As a result, the time from the current-limiting operation to recovery can be shortened.

Current-limiting reactor 6 in current-limiting device 10 has a function as a current-limiting element. Series capacitor 1 connected in series to current-limiting reactor 6 is for canceling an inductance (L) of aforementioned current-limiting reactor 6 by LC resonance, thereby achieving a lower impedance of current-limiting device 10 in the normal state. When an excessive current flows through current-limiting device 10 due to an accident and the like, superconducting current-limiting element 8 autonomously shifts to the normal conducting state at high speed as described above. Therefore, even if the operation timing of thyristor switch 4 lags behind the aforementioned current-limiting operation, application of an excessive load (excessive voltage) to between the terminals of series capacitor 1 can be prevented reliably. Furthermore, by using superconducting current-limiting element 8 as described above, a transient component of the passing current caused by the delay in operation timing of thyristor switch 4 can also be suppressed.

In addition, when an excessive current flows through current-limiting device 10 as described above, superconducting current-limiting element 8 shifts to the normal conducting state at high speed as described above, and thus, the current flowing through series capacitor 1 is diverted to the parallel circuit in which thyristor switch 4 is located. Therefore, the current having flowed through the series circuit including current-limiting reactor 6 and series capacitor 1 does not flow any longer, and thus, the LC resonance having canceled the inductance of current-limiting reactor 6 does not occur any longer. Therefore, the overcurrent can be limited by the impedance (current-limiting impedance) of current-limiting reactor 6.

In aforementioned current-limiting device 10, the bypass switch may include thyristor switch 4.

In aforementioned current-limiting device 10, the bypass switch may include other type of opening/closing device different from thyristor switch 4. For example, a semiconductor switch using a self-excited element, a mechanical opening/closing device and the like can be used as the bypass switch.

Aforementioned current-limiting device 10 may further include a current suppression circuit connected in series to the bypass switch. A circuit having suppression resistor 9 and suppression reactor 2 (coil) connected in parallel as shown in FIG. 1 can, for example, be used as the current suppression circuit.

Experimental Example

A simulation was performed as follows to check the effect of the present invention.
<Simulation Conditions>
(1) As to Model System Used in Simulation
Referring to FIG. 3, a model system studied in the simulation is a system in which electric power is transmitted from a power source 14 through a transformer 15, and the case of placing a new power source 13 in a secondary bus of transformer 15 is assumed. A rated voltage of a transformer secondary bus 12 was set at 77 kV. Three transformers each having a rated capacitance of 250 MVA were used as transformer 15. A short-circuit impedance of transformer 15 was assumed as 22%.

As a condition for newly-provided power source 13, a condition of a capacitance being 300 WA was assumed. A transient reactance Xd' of newly-provided power source 13 was assumed as 20% (on a self-capacitance basis).

Current-limiting device 10 is placed at an electric power transmission end of a line leading from bus 12 to electric power transmission lines 16. Namely, bus 12 and two electric power transmission lines 16 are connected via current-limiting device 10. Breakers 18 are placed at opposing ends of electric power transmission line 16.

Figure 3:
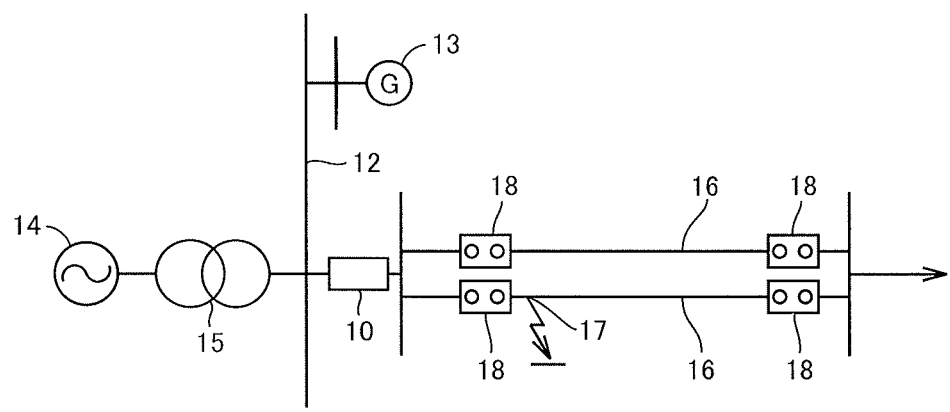
FIG. 3 is a schematic view showing a studied model system.

In the model system shown in FIG. 3, a rated current of the breaker is exceeded unless current-limiting device 10 is placed. The configuration of current-limiting device 10 is similar to that of current-limiting device 10 shown in FIG. 1. The following simulation was performed under the condition that the two lines are collectively compensated for by current-limiting device 10 as shown in FIG. 3.

(2) As to Conditions for Current-Limiting Device of Example of the Present Invention In the aforementioned model system, a study was made of suppressing a fault current to be 30 kA or less when a three-phase short circuit occurs at an accident point 17 in FIG. 3 and a current value becomes maximum. Properties of current-limiting device 10 that satisfies such a condition were determined as follows. Specifically, as to an inductive reactance (XL) of current-limiting reactor 6 in current-limiting device 10 of Example, assuming that an impedance of transformer 15 was 29.33%@1000 MVA and a transient reactance of power source 14 was 66.7%@1000 MVA, a synthetic impedance of power source 14 and transformer 15 became 20.4%@1000 MVA. Then, a fault current Is=1/(XL+0.204)×1000000 kVA/(√3×77 kV)≤30 kA, and thus, XL≥0.046 pu.

Therefore, a capacitive reactance Xc1 of series capacitor 1 was set at −j0.05 pu and an inductive reactance XL1 of current-limiting reactor 6 was set at j0.05 pu. With such setting, inductive reactance XL1 of current-limiting reactor 6 is compensated for by capacitive reactance Xc1 of series capacitor 1 in current-limiting device 10, and thus, current-limiting device 10 has a zero impedance in the normal state. In addition, a current-limiting resistance when superconducting current-limiting element 8 in current-limiting device 10 shifts to the normal conducting state was set at 6Ω.

(3) As to Current-Limiting Device of Comparative Example

Figure 4:
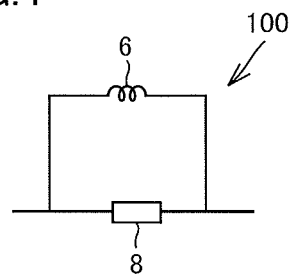
FIG. 4 is a circuit diagram for describing a current-limiting device of Comparative Example.

As Comparative Example, a similar simulation was also performed for the case in which a current-limiting device 100 configured as shown in FIG. 4 is placed in the model system, instead of current-limiting device 10 shown in FIG. 1. As shown in FIG. 4, current-limiting device 100 of Comparative Example has current-limiting reactor 6 and superconducting current-limiting element 8 connected in parallel. Inductive reactance XL1 of current-limiting reactor 6 shown in FIG. 4 is similar to inductive reactance XL1 of current-limiting reactor 6 shown in FIG. 1. In addition, the current-limiting resistance when superconducting current-limiting element 8 in current-limiting device 100 shown in. FIG. 4 shifts to the normal conducting state was set at 6Ω.

(4) As to Analysis Model Used in Simulation 4.3.1 (EMTP simple analysis model for SN-transition type superconducting current limiter) in the Technical Report, vol. No. 11088 published by the Institute of Electrical Engineers of Japan was used as an analysis model for superconducting current-limiting element 8. In addition, a current-limiting resistance after removal of the fault was set to linearly decrease from removal of the fault. As to current-limiting devices 10 and 100, operation time $T_{op}$ of superconducting current-limiting element 8 was set at 1 ms, by reference to a resistance waveform (temporal change of a generated resistance value) generated by a superconducting coil for a current limiter with quench-type of 6.6 kV 1.5 kA grade made of a metal-based NbTi wire rod.

In addition, an operation start current of superconducting current-limiting element 8 in current-limiting devices 10 and 100 was set at 2400 A (3.4 kA/√2). This value is twice as large as a steady current (1200 A).

Furthermore, in current-limiting device 10, when thyristor switch 4 operates and superconducting current-limiting element 8 is bypassed, the current passing through superconducting current-limiting element 8 is suppressed. Therefore, superconducting current-limiting element 8 was assumed to recover to the superconducting state 0.1 seconds after thyristor switch 4 operated and the current was diverted after the current-limiting operation (after occurrence of quench in superconducting current-limiting element 8).

(5) Conditions Assumed in Simulation

Occurrence of the three-phase short circuit (3LS) at accident point 17 shown in FIG. 3 (power source side bus close end 3LS) was assumed as a type of the fault. As a fault sequence, it was assumed that the three-phase short circuit occurred at time T=0.1 second, and breaker 18 operated (CB opposing ends were opened) at time T=0.2 second, and a fault line was interrupted.

<Result>

Figure 5:
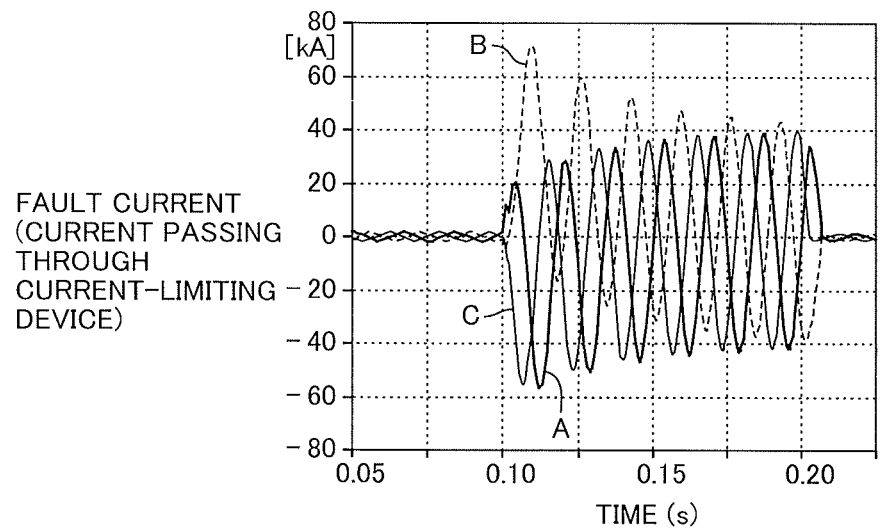
FIG. 5 is a graph showing a simulation result about Example of the present invention.
Figure 6:
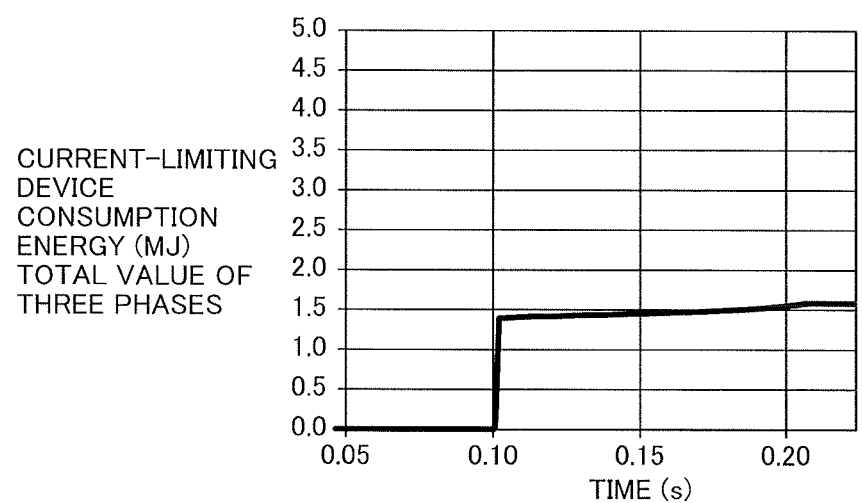
FIG. 6 is a graph showing a simulation result about Example of the present invention.
Figure 7:
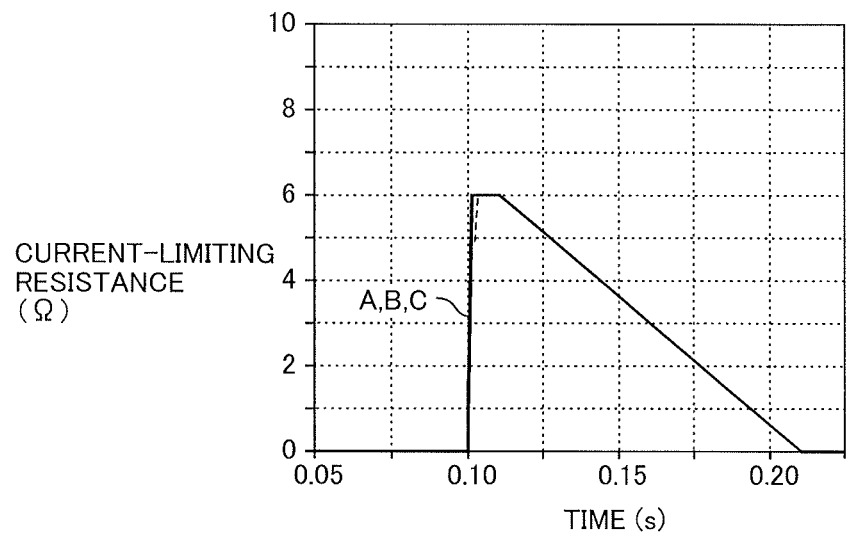
FIG. 7 is a graph showing a simulation result about Example of the present invention.
Figure 8:
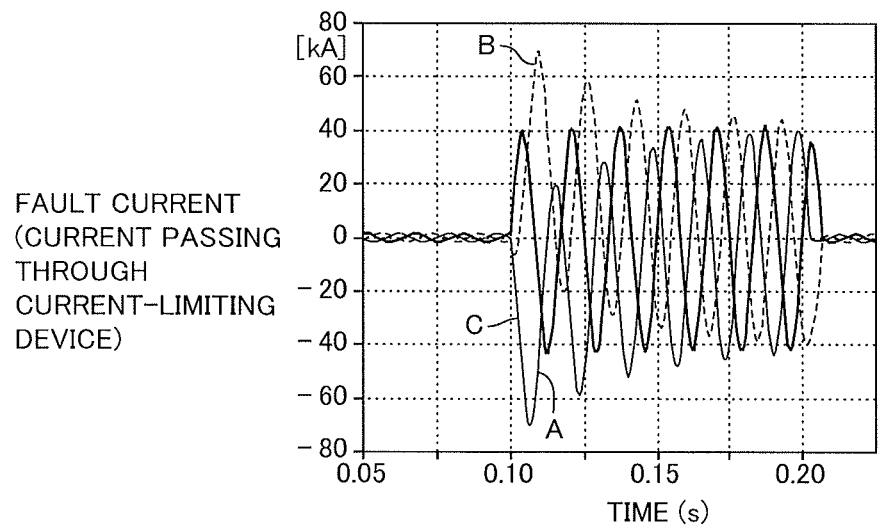
FIG. 8 is a graph showing a simulation result about Comparative Example.
Figure 9:
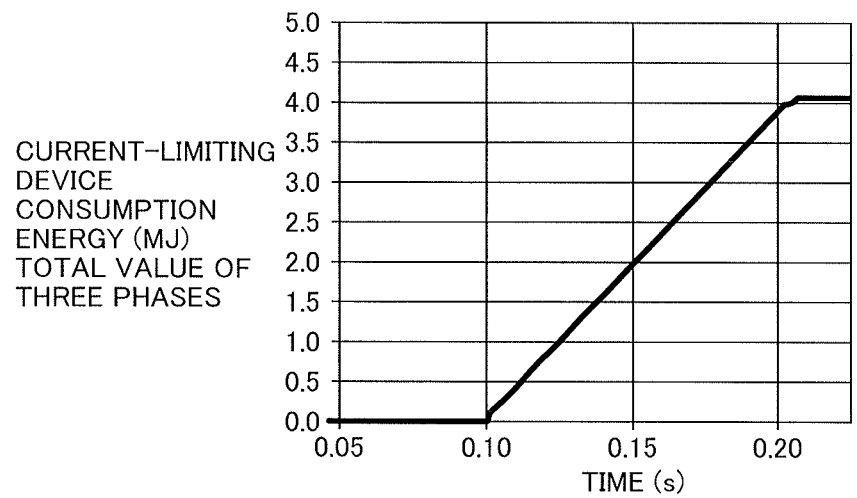
FIG. 9 is a graph showing a simulation result about Comparative Example.
Figure 10:
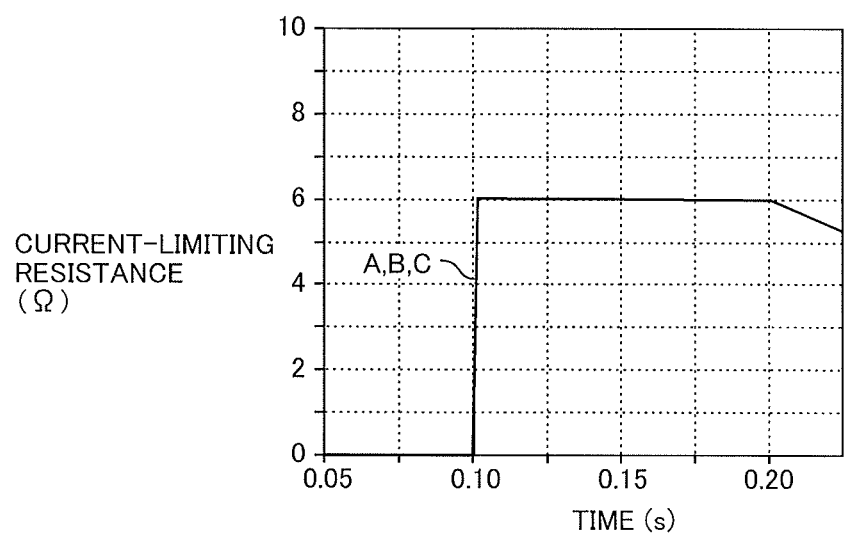
FIG. 10 is a graph showing a simulation result about Comparative Example.

FIGS. 5 to 7 show simulation results when current-limiting device 10 according to the present invention is applied, and FIGS. 8 to 10 show simulation results when current-limiting device 100 of Comparative Example shown in FIG. 4 is applied. In FIGS. 5 to 10, the horizontal axis in each graph represents the time, and the vertical axis in the graphs shown in FIGS. 5 and 8 represents the fault current (current passing through the current-limiting device). The unit of the current passing through the current-limiting device is kA. The vertical axis in FIGS. 6 and 9 represents the consumption energy (total value of the three phases) in the current limiter, and the unit thereof is MJ. The vertical axis in FIGS. 7 and 10 represents the current-limiting resistance, and the unit thereof is $\Omega$. As can be seen from FIGS. 5 and 8, in either of Example of the present invention and Comparative Example, an alternating current component of a short-circuit current except for a direct current component is approximately 28 kA (40 kA/$\sqrt{2}$) and the current is appropriately limited. In FIGS. 5 and 8, the respective components of the three phases of the current passing through the current-limiting device are indicated by a graph A, a graph B and a graph C. Since the magnitude of the short-circuit current is determined by the properties of current-limiting reactor 6, a difference is small between Example of the present invention and Comparative Example.

As can be seen from FIGS. 6 and 9, the consumption energy in current-limiting device 10 according to the present invention is 1.5 MJ, while the consumption energy in current-limiting device 100 of Comparative Example is 4 MJ. Therefore, the consumption energy is suppressed in the current-limiting device according to the present invention, as compared with that of Comparative Example. Since the consumption energy is suppressed as described above, the time to recovery to the superconducting state after transition of superconducting current-limiting element 8 to the normal conducting state is shortened (recovery to the superconducting state is speeded up). Therefore, in current-limiting device 10 according to the present invention, reinsertion of current-limiting device 10 into the power system at the time of recovery from the fault can be speeded up. In current-limiting device 10 according to the present invention, the short-circuit current passes through superconducting current-limiting element 8 during an extremely short time period until thyristor switch 4 operates, and thus, the consumption energy increases. However, the operation of thyristor switch 4 allows the fault current to be diverted to the parallel circuit, and thus, the consumption energy over the entire fault period increases very little. The resistance value of superconducting current-limiting element 8 decreases gradually during the fault period, and in accordance therewith, the fault current is slightly diverted to the superconducting current-limiting element 8 side. However, this does not matter very much.

On the other hand, when current-limiting device 100 of Comparative Example is used, the fault current is diverted to current-limiting reactor 6 immediately after superconducting current-limiting element 8 operates (quenches). Therefore, as shown in FIG. 9, the consumption energy immediately after occurrence of the fault is suppressed, as compared with that in FIG. 6. However, the fault current continues to flow through superconducting current-limiting element 8, and thus, the consumption energy increases continuously during the fault period. Therefore, the total consumption energy in Comparative Example becomes greater in the end than the consumption energy when current-limiting device 100 according to the present invention is used. The degree of diversion to current-limiting reactor 6 in current-limiting device 100 changes depending on a relationship between the current-limiting reactor and the current-limiting resistance value (resistance value of superconducting current-limiting element 8).

As described above, in current-limiting device 10 according to the present invention, the energy consumed during the current-limiting operation in the current-limiting device is suppressed to be extremely low, as compared with that of Comparative Example, and the current-limiting resistance value also decreases at an early stage. Therefore, the current-limiting device can be quickly reinserted into the system at the time of recovery from the fault.

In addition, in current-limiting device 10 according to the present invention, superconducting current-limiting element 8 operates autonomously by the fault current. Therefore, the overvoltage applied to between the terminals of series capacitor 1 caused by the response lag of thyristor switch 4 as well as the transient component of the passing current can be effectively suppressed.

It should be understood that the embodiments and the example disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The present invention is particularly advantageously applied to a current-limiting device including a superconducting current-limiting element.

REFERENCE SIGNS LIST

1 series capacitor; 2 suppression reactor; 4 thyristor switch; 5 control circuit; 6 current-limiting reactor; 8 superconducting current-limiting element; 9 suppression resistor; 10, 100 current-limiting device; 12 electric power substation bus; 16 electric power transmission line; 13 newly-provided power source; 14 power source; 15 transformer; 17 accident point; 18 breaker; 21, 22 connection point.

The invention claimed is:

1. A current-limiting device that uses a superconductor to perform a current-limiting operation, the current-limiting device comprising:
   a superconducting current-limiting element including said superconductor;
   a capacitor connected in series to said superconducting current-limiting element;
   a reactor further connected in series to a series circuit including said superconducting current-limiting element and said capacitor; and
   a bypass switch connected in parallel to said series circuit, the current-limiting device being configured so that, in a normal state, the bypass switch is turned off and, in the case where overcurrent flows in the current-limiting device, the superconducting current-limiting element autonomously shifts to a normal conducting state and the bypass switch is turned on.

2. The current-limiting device according to claim 1, wherein
   said bypass switch includes a thyristor switch.

3. The current-limiting device according to claim 1, further comprising
   a suppression circuit connected in series to said bypass switch.

4. The current-limiting device according to claim 2, further comprising
   a suppression circuit connected in series to said bypass switch.

* * * * *